Jan. 19, 1965 J. F. HILL 3,166,042

INFORMATION INDICATING DEVICES

Filed July 6, 1961

Inventor
John Francis Hill
By
Stevens Davis Miller & Mosher
Attorneys

United States Patent Office 3,166,042

Patented Jan. 19, 1965

3,166,042
INFORMATION INDICATING DEVICES

John Francis Hill, Bickley, England, assignor to Self-Adhesive Sign Company Limited, Kent, England Filed July 6, 1961, Ser. No. 122,236
Claims priority, application Great Britain, Aug. 4, 1960, 27,048/60
1 Claim. (Cl. 116—135)

This invention relates to devices for displaying information, especially such devices as include displaceable signals or indicators.

The invention provides a device comprising, in combination, a flat pocket of transparent plastics material, and thereon a plurality of parallel rows of elongated carriers for retaining signals or indicators slidable to selected positions along the carriers.

The device is suitable for many different purposes. Thus, with advantage, it can be used indefinitely with various kinds of interchangeable datum sheets or cards for indicating in a readily displayable manner say progress information in relation to time. Moreover, a plurality of the devices, each in conjunction with a datum sheet or card and of a suitable size, can be removably held in a folder or ring-type or equivalent file; larger sizes can be used as so-called wall charts.

Another possible use of the device is for announcement or display messages, the signals or indicators then bearing letters of the alphabet which are arranged in elongated carriers to spell out parts of the message which are changeable; static information would be printed on the card covered by the transparent pocket and would thus be permanently visible.

By way of non-limiting example two embodiments of the invention are illustrated on the accompanying drawings, whereon:

Figures 1, 2, 3:
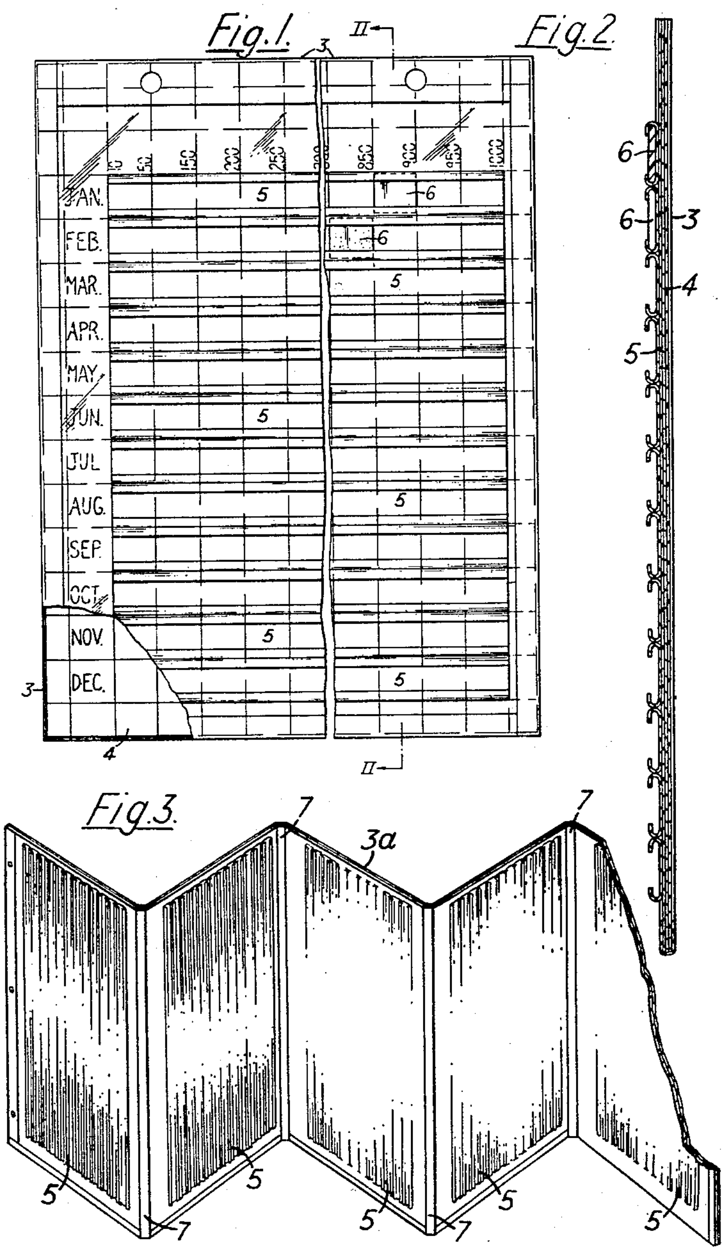
FIG. 1 is a face view of a device housing a datum sheet or card.
FIG. 2 is an enlarged section on line II—II of FIG. 1, of one embodiment.
FIG. 3 is a perspective view partly broken away of the other illustrated embodiment.

Referring now in detail to FIGS. 1 and 2, the numeral 3 denotes a rectangular pocket of transparent plastics material open along one edge for the insertion of a correspondingly shaped datum sheet or card 4. One outer surface of the pocket has secured thereon, by bonding or otherwise a plurality of adjacently situated index carriers 5 each in the form of a strip, channel-shaped in section (see FIG. 2) and preferably of transparent plastics material.

The described device may be used, for example, with a suitably columned datum sheet 4, as a progress chart, slidable indicators 6 being variously positioned in the carriers 5 to denote progress either made and/or required in relation to time or dates.

For instance, with a datum sheet 4 as shown in FIG. 1, an indicator 6 could be slid to appropriate positions along the carriers 5 for the particular month concerned to indicate the number of articles actually made or sold in a given period against another of the indicators set to denote the target number of the same period.

A plurality of devices as above described and illustrated by FIGS. 1 and 2, with different kinds of datum sheets, may be of a size capable of being accommodated together in a folder or ring type or equivalent file, so making it easily possible to carry a plurality of records pertaining to any particular business to different places for discussion or consideration.

Although carriers 5 are shown only on one outer surface of the pocket 3, it will be evident that carriers may be secured on both outer surfaces and used with a single datum sheet marked on its front and back, or with two separate datum sheets inserted back to back in the pocket.

In the embodiment illustrated by FIG. 3, an elongated pocket 3*a* of transparent plastics material and open along one of its long edges as in the case of the pocket 3 (FIGS. 1 and 2) is subdivided, as by welding at the places 7, to form a plurality of foldable portions each having index carriers 5 as already described and each capable of receiving a datum sheet. Here, again, there is provided in compact portable form a plurality of indicating devices for different information.

However, the invention also extends to information display devices of large size suitable for use on walls for example, the same comprising a sheet of transparent plastics material for attachment to a wall or wall board, over a chart or datum sheet if necessary, and thereon a plurality of parallel rows of elongated carriers for signals or indicators slidable to different positions along the carriers. If desired, there may be a series of holes or slots coinciding with the ends of the carriers, and a plurality of endless cords or equivalent threaded through the holes or slots and extending along the carriers on the front of the sheet and disappearing around the back of the sheet; one half length of each cord may be of the same colour as the background and the other half length of a contrasting colour, the join of the two colours thus constituting a leading signal. This form of the device may be superimposed on a suitable datum sheet or card and the endless cords positioned to bring the junction line between the differently coloured parts of each to a required indicating position.

When transparent plastic sheets or pockets with transparent elongated carriers attached to them are superimposed one over the other it becomes possible to compare factors relevant to both sheets in relation to a common datum scale which can be placed behind both sets of charts. This can be very useful for example when comparing say, sales figures achieved by representatives in one year with those achieved by the same representatives in the previous year, or the sales figures achieved by one representative as compared by those achieved by another.

The invention may also be used by schools where the need for an easily changeable type of school time-table chart is requried but seldom provided because the manufacturing costs and service inherent with mechanical wall charts make their price prohibitive.

I claim:

An information indicating device comprising a pair of flat identically shaped superposed members having mating edges joined together except at one portion so as to form a pocket, at least one of said members being transparent, a datum sheet inserted into the pocket through the unattached edges so as to be viewable through the transparent member, said transparent member having an outer surface, a plurality of elongated transparent C-shaped elements affixed to the outer surface of the transparent member and arranged in parallel relation, each of said C-shaped elements having a web portion fixedly superimposed on the outer surface of the transparent member and having inwardly facing curved leg portions to define an indicator carrier, said indicator carriers being in parallel adjoining relation and elongated flat slidable indicators slidably disposed in said carriers and selectively slidable to various positions along the carriers.

References Cited in the file of this patent

UNITED STATES PATENTS

| | | |
|---|---|---|
| 761,119 | Weston | May 31, 1904 |
| 868,758 | Bexell | Oct. 22, 1907 |

| | | |
|---|---|---|
| 1,730,883 | Grant | Oct. 8, 1929 |
| 1,766,362 | Sears | June 24, 1930 |
| 2,329,007 | Simon et al. | Sept. 7, 1943 |
| 2,795,205 | Wells | June 11, 1957 |
| 2,918,921 | Carlston | Dec. 29, 1959 |
| 2,952,930 | Hartle et al. | Sept. 29, 1960 |

FOREIGN PATENTS

| | | |
|---|---|---|
| 309,337 | Great Britain | Apr. 11, 1929 |